United States Patent [19]

Nozaki

[11] Patent Number: 5,038,522
[45] Date of Patent: Aug. 13, 1991

[54] WEATHER STRIP

[75] Inventor: Masahiro Nozaki, Ama, Japan

[73] Assignee: Toyoda Gosei Co., Ltd., Nishikasugai, Japan

[21] Appl. No.: 552,901

[22] Filed: Jul. 16, 1990

[30] Foreign Application Priority Data

Aug. 2, 1989 [JP] Japan .................. 01-090407

[51] Int. Cl.$^5$ .............................................. E06B 7/16
[52] U.S. Cl. ......................................... 49/497; 49/491
[58] Field of Search .................. 49/497, 490, 491, 479

[56] References Cited

U.S. PATENT DOCUMENTS

| | | | |
|---|---|---|---|
| 3,742,649 | 7/1973 | Dochnahl | 49/491 X |
| 4,769,950 | 9/1988 | Ogawa et al. | 49/497 X |
| 4,787,668 | 11/1988 | Kawase et al. | 49/497 X |
| 4,976,069 | 12/1990 | Arima et al. | 49/497 |

FOREIGN PATENT DOCUMENTS 59-60050  4/1984  Japan .

OTHER PUBLICATIONS

ATZ Automobiltechnische Zeitschrift 90, 1988, Neuer VW Passat p. 589.

*Primary Examiner*—Philip C. Kannan
*Attorney, Agent, or Firm*—Cushman, Darby & Cushman

[57] ABSTRACT

A weather strip to be attached a body panel of a motor vehicle has a trim portion having a U-shaped cross section to be attached to a flange of the body panel, a tubular sealing portion projecting from an outer surface of an outside wall of the trim portion, and a covering lip extending from the outer surface of the outside wall of the trim portion or the tubular sealing portion and covering an end of a trim garnish. The trim portion and at least a part of the covering lip are made of solid rubber, whereas the tubular sealing portion is made of sponge rubber.

7 Claims, 4 Drawing Sheets

WEATHER STRIP

FIELD OF THE INVENTION

This present invention relates to a weather strip, and more particularly to a weather strip to be attached to a body panel of a motor vehicle.

BACKGROUND OF THE INVENTION

Weather strips of the general type of this invention may be seen in Japanese laid open patent application published under No. 59-60050 on Apr. 19, 1984.

As shown in FIG. 8, a conventional weather strip 1 is provided with a trim portion 2 which is made of solid rubber and has retaining lips 3 on the inner surfaces thereof. A tubular sealing portion 4 made of sponge rubber projects from an outer surface of an outside wall of the trim portion 2. Within the trim portion 2 is embedded an insert 7.

The weather strip 1 is fitted to a flange formed in an edge of a body panel B through the retaining lips 3. The tubular sealing portion 4 is pressed by an inner panel 10 of the vehicle door. A trim garnish 8, which connects to body panel B at a place not shown, covers the trim portion 2, and the end of the trim garnish 8 is near the base portion of the tubular sealing portion 4. The trim garnish 8 is not a part of the weather strip but is otherwise part of the vehicle trim.

The trim garnish 8 is made of plastic. As shown in FIG. 7, there are tips 9 on the end of the trim garnish 8 along a parting line L of molds (not shown).

As shown in FIG. 8, the tip 9 is exposed, i.e., is externally seen from the direction of an arrow $V_2$. When door D is closed, the tubular sealing portion 4 is pressed in the direction of an arrow $F_0$ by the inner panel 10 of door D, and being made of sponge rubber the tubular sealing portion 4 readily deforms in the direction of arrow $F_1$ (as shown a dotted line). As a result, tip 9 is more conspicuous and mars the esthetic appearance. Moreover, the tubular sealing portion 4 is now further away from the adjacent end of trim garnish 8, and hence the opening between the trim garnish 8 and the tubular sealing portion 4 becomes even larger. That opening also mars the esthetic appearance.

SUMMARY OF THE INVENTION

An object of the present invention is to provide a weather strip which prevents external viewing of tip 9 and also prevents an opening between the trim garnish and the tubular sealing portion.

Therefore, according to the present invention, there is provided a weather strip including a trim portion having a U-shaped cross section and being made of solid rubber and a tubular sealing portion made of sponge rubber, which projects from an outer surface of an outside wall of the trim portion. A covering lip extending from the outer surface of the outside wall of the trim portion covers an end of the trim garnish, and the covering lip has a covering portion which is made of solid rubber. A groove formed between the outside wall of the trim portion and the covering portion of the covering lip receives an end of the trim garnish.

DETAILED DESCRIPTION OF PREFERRED EMBODIMENTS

Figure 1:
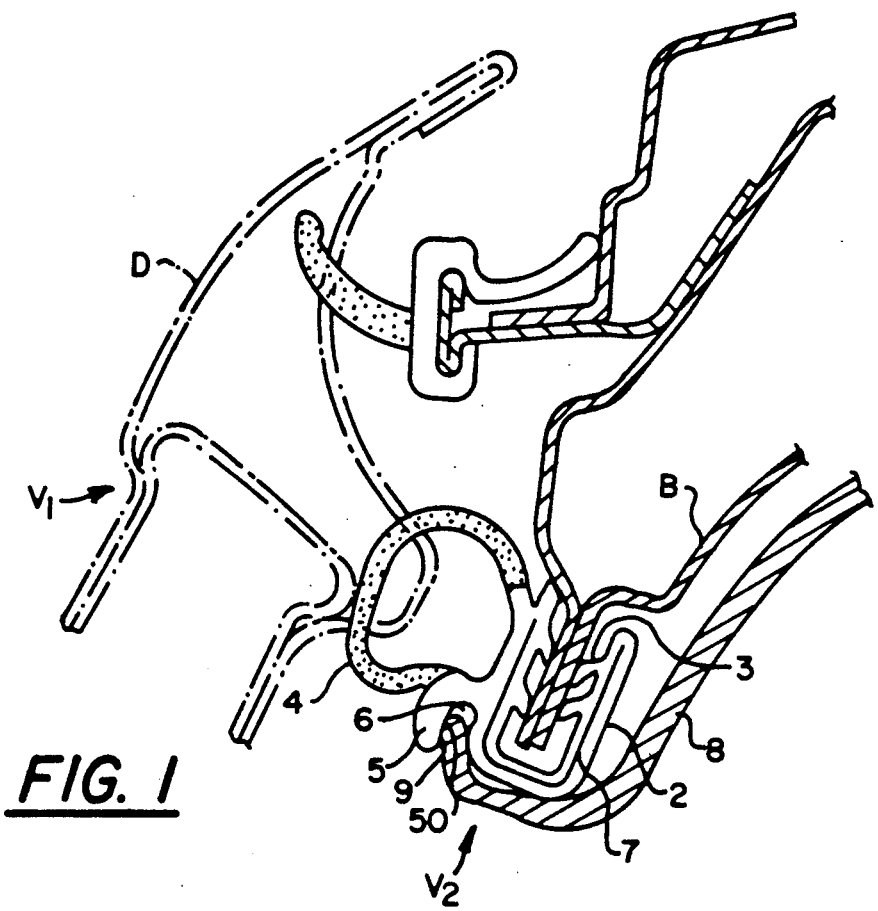
FIG. 1 is a cross sectional view showing an attached state of a first embodiment of a weather strip according to the present invention, which is taken along a line I—I in FIG. 3.
Figure 2:
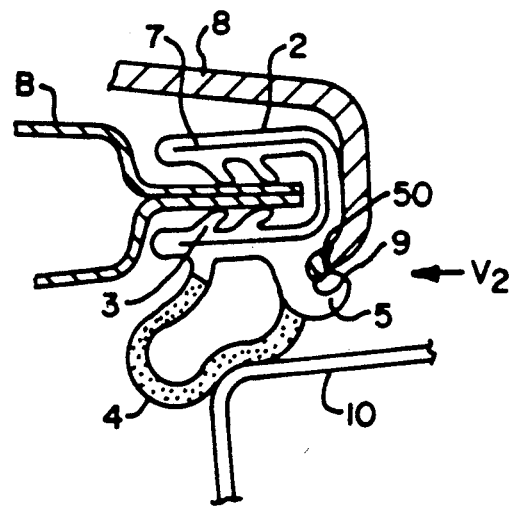
FIG. 2 is a cross sectional view showing an attached state of the first embodiment of a weather strip according to the present invention, which is taken along a line II—II in FIG. 3.
Figure 3:
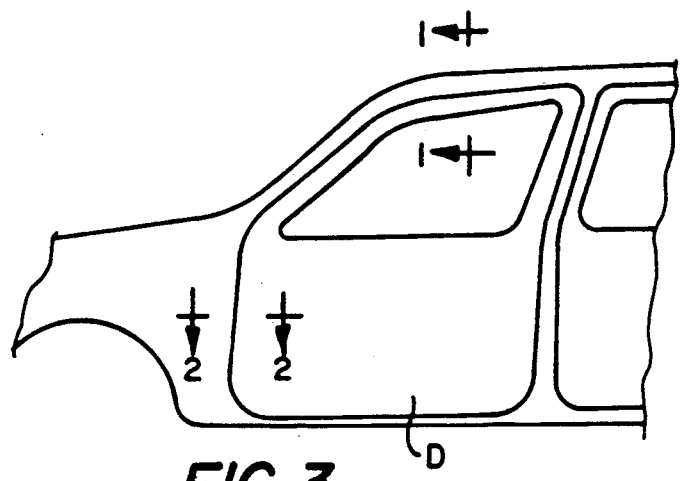
FIG. 3 is a side view of a motor vehicle to which weather strips according to the present invention are applied.

In a motor vehicle such as shown in FIG. 3, a weather strip is attached to the body panel. Figs. 1 and 2 illustrate a first embodiment of a weather strip according to the present invention, wherein the weather strip 1 is attached a body panel B. In the first embodiment, the weather strip 1 is provided with a trim portion 2 of a U-shaped cross section to be attached to a flange of body panel B, within which insert 7 is embedded. Retaining lips 3 extend from inner surfaces of the trim portion 2 toward opposed inner surfaces. A tubular sealing portion 4 projects outward from an outer surface of an outside wall of the trim portion 2, and a covering lip 5 of J-shaped cross section extends outward from an outer surface of the outside wall of trim portion 2. The covering lip 5 has a covering portion 50 which covers an end of a trim garnish 8 when the weather strip 1 is attached to a body panel B, and a groove 6 is formed between the outside wall of the trim portion 2 and the covering portion 50 of the covering lip 5, which receives the end of the trim garnish 8.

The trim portion 2, the retaining lips 3 and the covering lip 5 are made of solid rubber, and the tubular sealing portion 4 is made of sponge rubber. All four parts are integrally formed by extrusion.

When the weather strip 1 according to the present invention is attached to the body panel B, the covering lip 5 covers the end of the trim garnish 8 which has a tip 9. Since the covering lip 5 is made of solid rubber, the covering lip 5 has a more uniform or constant shape than the tubular sealing portion 4 which is made of sponge rubber. Therefore, the tip 9 of the trim garnish 8 always is covered by the covering lip 5, so that the tip 9 is not seen from the direction of arrows $V_1$ and $V_2$ when the door is open.

Figure 8:
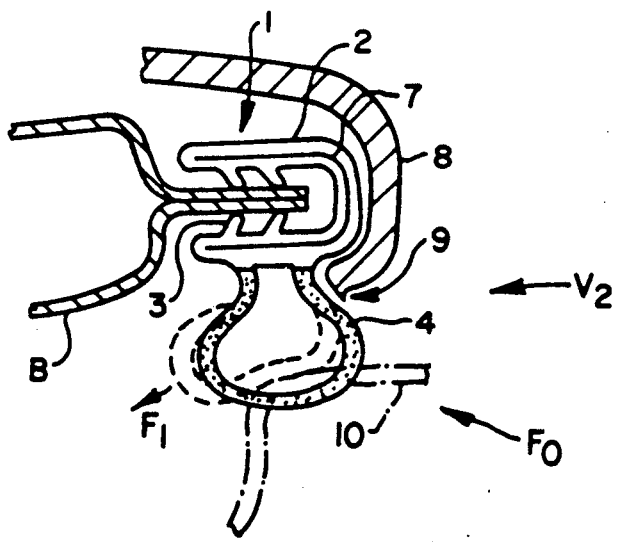
FIG. 8 is a cross sectional view of a conventional weather strip.

Moreover, the covering lip 5 covers up any slight differences from vehicle to vehicle in the exact size and/or positioning of the trim garnish 8 by covering the end of the trim garnish 8. There is no opening between the trim garnish 8 and the covering lip 5 from the direction of arrow $V_2$ when the door D is open as in FIG. 1, because the covering lip 5 is made of solid rubber and holds its shape. When the door is closed, door panel 10 presses against and deforms the tubular sealing portion 4 as shown in FIG. 2. Covering lip 5 continues to cover tip 9 and no exterior opening appears therebetween. The length of the tubular sealing portion 4 between the door panel 10 and lip 5 is much less according to this invention than the corresponding length in FIG. 8, and hence the weather strip 1 is less visible for better vehicle appearance.

Figure 4:
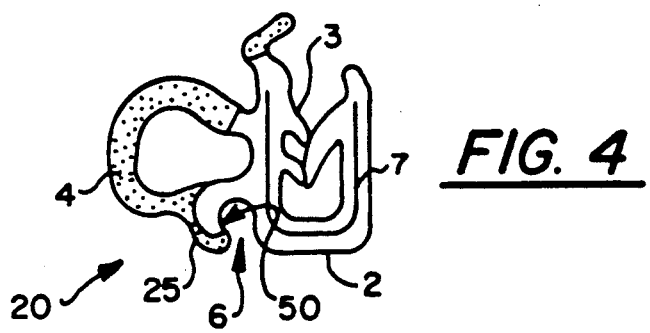
FIG. 4 is a cross sectional view of a second embodiment of a weather strip according to the present invention.

FIG. 4 illustrates a second embodiment of a weather strip according to the present invention.

As shown in FIG. 4, a second embodiment of the weather strip 20 is formed the same as the first embodiment of weather strip 1 except that covering lip 25 is made of solid rubber and sponge rubber. The covering portion 50 of covering lip 25 is made of solid rubber, but the side opposite portion 50 of the covering lip 25 is made of sponge rubber. The solid rubber portion causes the lip 25 to retain its shape and to continue covering the end of trim garnish 8 without any opening therebetween even when a door panel deforms the tubular sealing portion 4.

Therefore, the weather strip 20 of the second embodiment achieves the object of the present invention.

Figure 5:
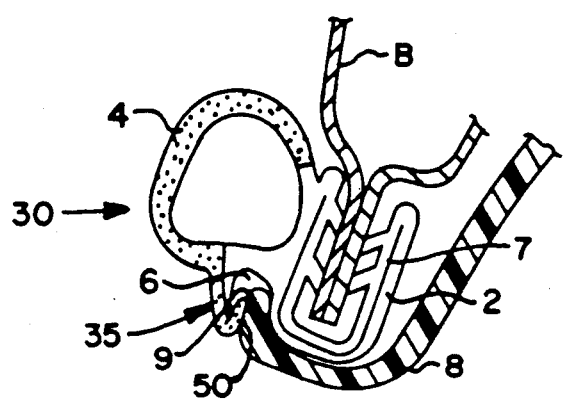
FIG. 5 is a cross sectional view of a third embodiment of a weather strip according to the present invention.

FIG. 5 illustrates a third embodiment of a weather strip according to the present invention in which weather strip 30 is formed the same as the second embodiment of the weather strip 20 except for the covering lip 35.

Figure 5A:
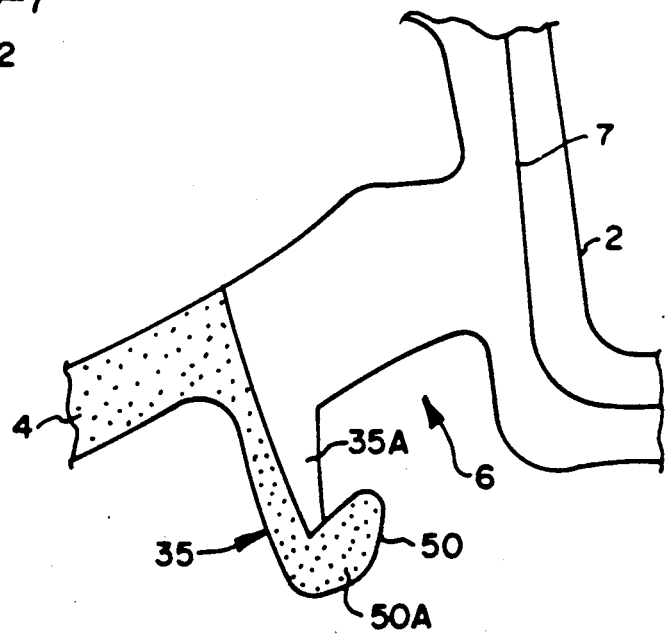
FIG. 5A is an enlargement of a portion of FIG. 5.
Figure 7:
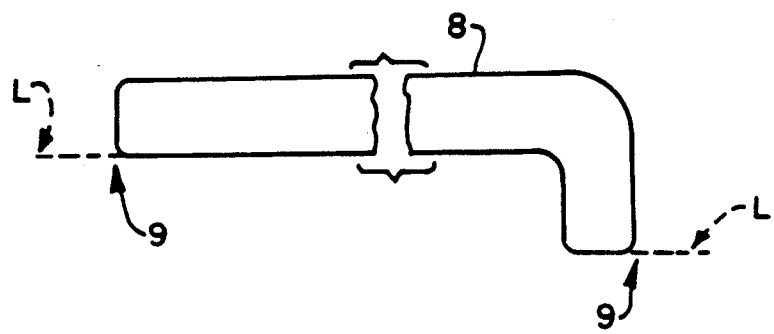
FIG. 7 is an outline of a side view of a trim garnish used with embodiments of a weather strip according to the present invention.

The covering lip 35 is made of solid rubber and sponge rubber and bends back inwardly from the static position shown in FIG. 5A so that when in use the sponge rubber outer end 50A of the covering lip 35 turns toward the connected portion of the tubular sealing portion 4 and the trim portion 2. The covering lip 35 extends outward from an outer surface of the tubular sealing portion 4 as opposed to extending from the trim portion 2 as in the previous embodiments. The covering portion 50 of the covering lip 35 is made of sponge rubber, but the covering lip 35 has a base portion 35A, which borders groove 6, and which is made of solid rubber and hence rigid.

Therefore, the covering lip 35 covers tip 9 and keeps its own shape, while the bending portion 50 of the covering lip 35 covers up even larger differences in the trim garnish 8 than in the previous embodiments.

The third embodiment also achieves the object of this invention.

Figure 6:
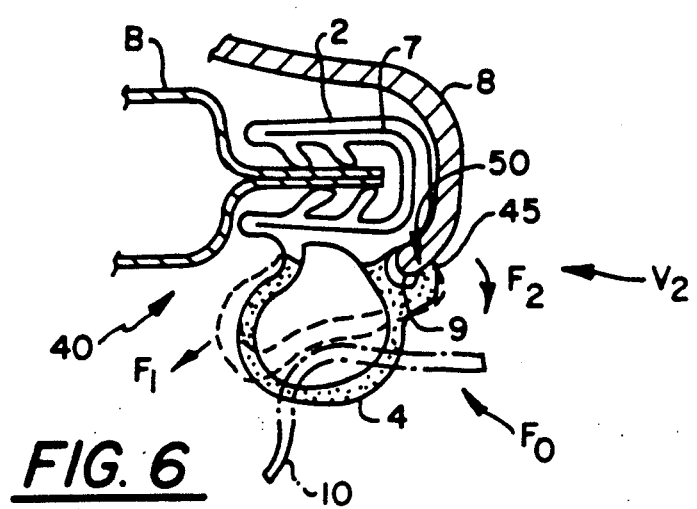
FIG. 6 is a cross sectional view of a comparative embodiment.

FIG. 6 illustrates a comparative embodiment of a weather strip made earlier by the same inventor as set forth in Japanese Utility Model Application Sho 63-165469 filed Dec. 20, 1988.

As shown in FIG. 6, a comparative embodiment of the weather strip 40 is formed the same as the first embodiment of the weather strip 1 except that covering lip 45 is wholly made of sponge rubber.

The weather strip 30 according to the comparative embodiment is attached to the body panel B. When the door is open, the tip 9 of the trim garnish 8 is always covered by the covering lip 45, and the covering lip 45 closes the opening between the trim garnish 8 and the tubular sealing portion 4. Moreover, lip 45 covers up any differences from vehicle to vehicle of the trim garnish 8.

But when the door is closed, the tubular sealing portion 4 is pressed in the direction of an arrow $F_0$ by the inner panel 10 of the door, and the tubular sealing portion 4 deforms as shown by the dotted line. Being made wholly of sponge rubber, the covering lip 45 readily moves away from the end of trim garnish 8, leaving an opening viewed from the exterior direction $V_2$, and the tip 9 is exposed. Since tip 9 shows externally and there is an opening between the end of the trim garnish 8 and the tubular sealing portion 4, the FIG. 6 comparative embodiment of the weather strip 40 mars the appearance of the vehicle.

Therefore, weather strip 40 of the FIG. 6 comparative embodiment does not achieve the object of the present invention, meaning that for this invention at least a part of the covering lip must be made of a rigid material such as solid rubber as in FIGs. 1, 2, 4 and 5, which is stronger than sponge rubber, in order to prevent the tip 9 from being seen and to prevent the occurrence of an opening between the trim garnish 8 and tubular scaling portion 4 when the vehicle door is closed as well as open.

Further embodiments will become apparent to those skilled the art, but this invention is limited only by the scope of the following claims.

What is claimed is:

1. 1 A weather strip to be attached to a body panel of a motor vehicle having a trim garnish adjacent said panel comprising:

a trim portion for attachment to said body panel, said trim portion having a U-shaped cross section, an outside wall with an outer surface and being made of solid rubber, a tubular sealing portion projecting from said outer surface of the outside wall of said trim portion, and a covering lip extending from one of said portions for covering an end of said trim garnish;

a groove being formed between said outside wall of said trim portion and said covering lip for receiving said end of said trim garnish, at least a part of said tubular sealing portion being deformable, and at least a part of said covering lip bordering said groove being made of solid rubber for maintaining said trim garnish covered even when said tubular sealing part is deformed.

2. A weather strip according to claim 1, wherein all of said covering lip is made of solid rubber.

3. A weather strip according to claim 1, wherein said covering lip has opposite said groove a portion which is made of sponge rubber.

4. A weather strip according to claim 1, wherein said covering lip extends from said trim portion.

5. A weather strip according to claim 1, wherein said covering lip extends from said tubular sealing portion.

6. A weather strip according to claim 5, wherein said covering lip includes, opposite its said part which borders said groove, a sponge rubber portion which extends around an end of said covering lip part.

7. A weather strip according to claim 1, wherein at least said deformable part of said tubular sealing portion is made of sponge rubber.

* * * * *